United States Patent
Cornwell

[15] 3,669,417
[45] June 13, 1972

[54] METHOD OF MIXING AND PLACING CONCRETE

[72] Inventor: Charles E. Cornwell, Alexandria, Va.
[73] Assignee: Jennings Bailey, Jr., Frederick, Md.
[22] Filed: Dec. 21, 1970
[21] Appl. No.: 100,198

[52] U.S. Cl. ........................................................259/147
[51] Int. Cl. ................................................B28c 5/06
[58] Field of Search..............259/145, 146, 147, 148, 149, 259/151, 153, 154, 4, 18

[56] References Cited

UNITED STATES PATENTS

| 998,762 | 7/1911 | Faller | 259/151 |
| 2,316,705 | 4/1943 | Morgan | 259/146 |
| 2,394,561 | 2/1946 | Parkhurst | 259/151 |
| 2,758,945 | 8/1956 | Widmayer | 259/147 |
| 3,026,094 | 3/1962 | True | 259/147 |

Primary Examiner—Robert W. Jenkins
Attorney—Jennings Bailey, Jr.

[57] ABSTRACT

Concrete is produced by mixing cement with substantially the exact amount of water needed to produce a setting of the cement, and the mixture is then thoroughly agitated until its viscosity is substantially reduced. Dry sand or other aggregate is then added, and mixed with the slurry. This mixture is then pumped under pressure to a nozzle, which has an outlet passage tapering inwardly and ending in a transverse slot. Air under pressure is emitted in the form of jets into the tapering end part of the nozzle on the outside of the concrete mix flowing therethrough.

2 Claims, 5 Drawing Figures

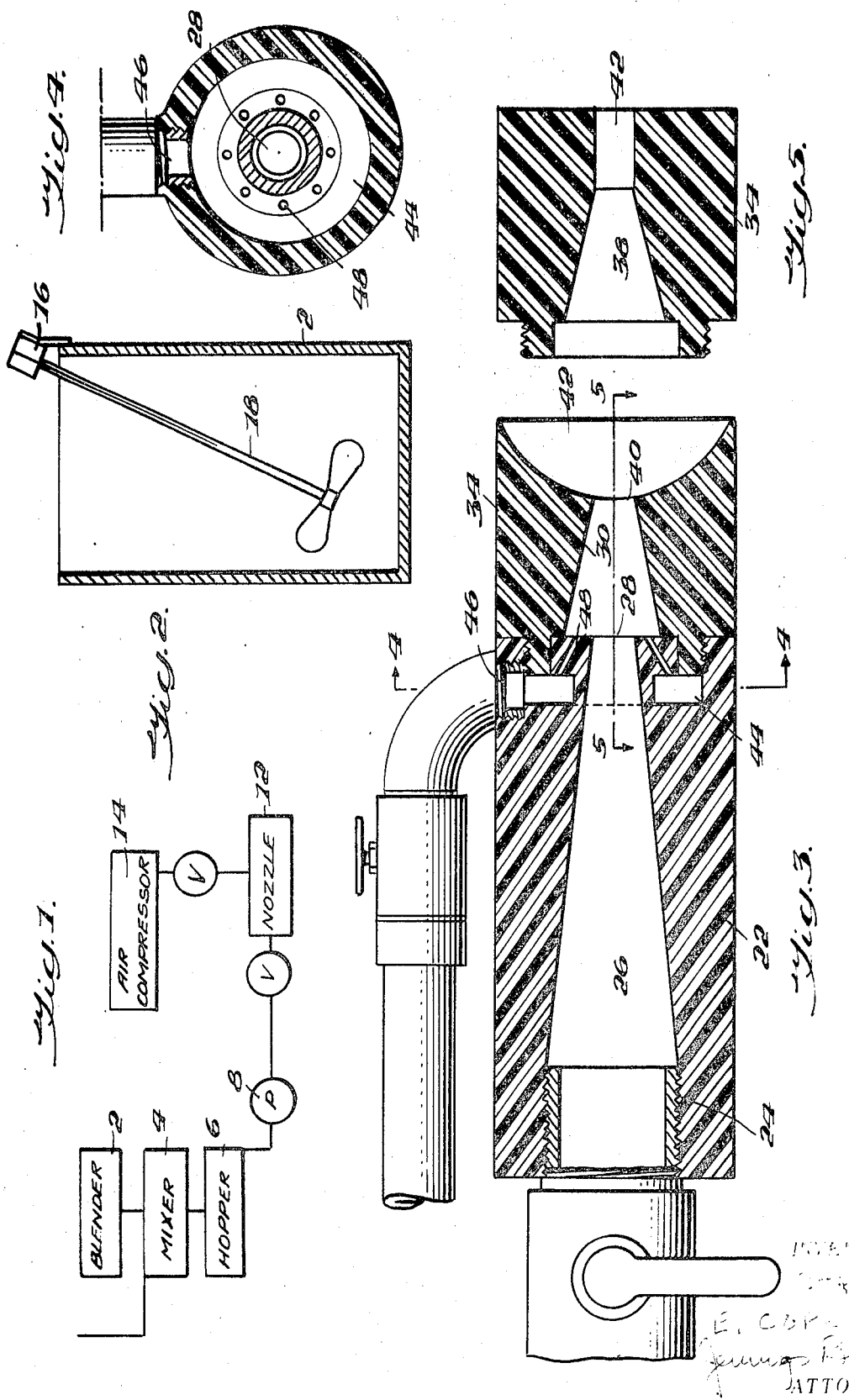

METHOD OF MIXING AND PLACING CONCRETE

BACKGROUND OF THE INVENTION

1. Field of the Invention

The invention relates to a method of placing concrete and to apparatus for use therein.

2. The Prior Art

It has been known in the past to spray a slurry of concrete containing water, cement and sand or aggregate. Such procedures have not been particularly satisfactory because of the difficulties involved in obtaining proper uniform consistency capable of being projected through a spray nozzle. Most cements when admixed with water at the rate of 35–37 lbs. of water per 100 lbs. of cement produce a substantially unworkable mixture, incapable of being sprayed or otherwise worked to a desired final form. The addition of more water to make the product workable results in a decrease in the final strength after the cement is set.

When water, cement and aggregate such as sand are admixed in quantities necessary to produce a workable product, because of the absorption of some of the water by the sand, extra water is required in order to provide the amount necessary for reaction with the cement during setting. This extra water results in reduced strength in the final set product.

It has been found that the use of a slurry of the type according to the invention causes totally impermissible wear on ordinary pumps, because of the abrasive nature of the slurry.

SUMMARY OF THE INVENTION

Applicant has found that it is possible to produce a concrete which when set has substantially greater strength than normal concrete, without the requirement of expensive additives, by mixing together cement and just enough water to set the cement, this being in most cases an amount of the order of 35–37 lbs. of water per 100 lbs. of cement, and then subjecting the normally unworkable mixture to violent beating in a blender, which results in producing a much less viscous and more workable slurry of water and cement. This slurry is then admixed with dry sand, and is pumped under substantial pressure through a nozzle which produces a wide fan of concrete mix of substantially uniform consistency throughout.

The invention particularly includes a nozzle formed of polyurethane or other suitable abrasion resistant material, which nozzle includes an inwardly tapering passage and a tip part having another inwardly tapering passage therein, the inlet of which is substantially greater in diameter than the outlet of the first tapering passage. This second tapering passage terminates in a slit of substantially greater length than the outlet part of the second passage but of equal or somewhat less width. Provision is made for blowing air under pressure into the second passage at its larger end, this air acting to encase to a certain extent of the concrete flowing through the passage and further acting to enhance the spreading action of the nozzle to give a fan effect.

In the normal mixing of concrete, a substantial part of the water is absorbed in or on the aggregate particles, which means that a substantial excess of water over that needed to react with the cement must be used. On the other hand, in applying the process of the present invention, the slurry which comes into contact with the sand is absorbed onto or in the sand particles, so that a much better adhesion between the particles is obtained, resulting in greater strength in the product.

BRIEF DESCRIPTION OF THE DRAWINGS

In the drawings:

FIG. 1 shows diagrammatically a system for carrying out the invention;

FIG. 2 shows a suitable blender;

FIG. 3 is a longitudinal cross-section through the nozzle;

FIG. 4 is a cross-section on the line 4—4 of FIG. 3; and

FIG. 5 is a cross-section on the line 5—5 of FIG. 3.

FIG. 1 of the drawings shows a system which includes a blender 2, in which water and cement are admixed, in the quantities substantially those necessary to produce setting of the concrete. This with most cements would be a proportion of about 35–37 lbs. of water to 100 lbs. of cement. From the blender, the slurry produced in a manner to be described below goes to a mixer 4 in which it is admixed with substantially dry sand (100–150 lbs. for each 100 lbs. of cement) and then to a hopper 6 from which it is pumped by a pump 8 through a valve 10 to the nozzle 12. Air is supplied to the nozzle from an air compressor 14.

A suitable type of blender is shown in FIG. 2. This is simply a tank with a motor 16 driving through a shaft 18 a propeller 20. This propeller when driven at a high speed will be effective to agitate the mixture of cement and water, causing cavitation which will draw air down into the bottom portion of the tank and produce more thorough stirring action.

The slurry first formed in the blender 2 is very difficult to handle, because of its high viscosity, but, if it is sufficiently agitated and stirred by the blade 20, its viscosity will be substantially reduced. In fact, the viscosity is sufficiently reduced so that it can be pumped through the spray gun and will penetrate a number of layers of wire or expanded metal. The sand being added, only just before it is sprayed from the gun, does not need to be wet, and therefore does not require additional water which would reduce the strength of the set concrete and impair its setting properties. On the other hand, the sprayed concrete according to the invention does not set appreciably faster than a normally sprayed concrete mix.

The nozzle 12 is shown in detail in FIGS. 3 to 5. It includes a main body portion 22 adapted to be threaded onto the outlet 24 of valve 10. This body portion is formed of polyurethane, which is very resistant to abrasion by the cementicious material which is pumped through it. The body also contains, extending from the end of the valve outlet 24, a passage 26 tapering downward inwards the other end of the nozzle and ending in an opening 28. Opening 28 opens into another tapering passage 30 in a tip portion 34 of the valve also formed of polyurethane, which has a threaded ring portion 36 engaging in an annular groove in the front end of the body 22. This tapering passage 30 starts with a diameter substantially larger than that of the opening 28 and tapers down to about the same size as the opening 28. This passage is formed by a conical shaper. It is intersected at its outlet 40 by a slot 42 formed by a circular narrow grinding member and having its inner face in the form of a portion of a cylinder.

In the front end of the body 22 is an annular chamber 44, which connects through an opening 46 to valve 10. There are a number of smaller passages 48 leading from the annular chamber 44 to the inner or rear end of the passage 38, outside of the opening 28.

With this arrangement, when the device is in operation air under pressure of about 40 psi is admitted through holes 48 into the outer portion of the passage 38, while at the same time the pump 8 is pumping the concrete mixture into the passage 26. The material issuing from the nozzle forms a fan of substantially uniform consistency, which can be sprayed on a backing such as expanded metal or the like or on any desired rough material and will form a hard and impervious construction, of substantially greater strength than that made by normal methods.

The fact that the air is introduced at the very edge of the expansion chamber causes the material entering the expansion chamber to break up from an extruded substance to smaller individual pieces that are then propelled or accelerated through an identical sized exit to the surface being sprayed.

The expansion chamber and air pressure control the material volume and the actual consistency of the material being sprayed. By adjusting the air volume, the material can be sprayed with great impact on the surface and a very hard compaction is achieved.

The expansion chamber is contoured to provide a unique air circulation in the chamber and along the tapered sides to the exit. A boundary layer effect is created and the air forms a bearing between the sides and the material being sprayed. This unique effect reduces the wear in the chamber and exit sides.

The nozzle is adapted for other uses than the spraying of concrete mix, although it has special advantages for that purpose.

What is claimed is:

1. In the placing of concrete, the steps of admixing cement with water in a quantity just substantially great enough to produce setting of the cement, thereby forming a relatively viscous material, beating said material vigorously until its viscosity is substantially reduced to form a slurry, admixing substantially dry aggregate material with said slurry, and pumping the resulting mixture through a nozzle while introducing air under pressure on the outside of the material flowing through the nozzle.

2. A process as claimed in claim 1, in which the proportion of water to cement is substantially 35–37 lbs. of water per 100 lbs. of cement.

* * * * *